US011537751B2

(12) United States Patent
Al-Kabra et al.

(10) Patent No.: US 11,537,751 B2
(45) Date of Patent: *Dec. 27, 2022

(54) USING MACHINE LEARNING ALGORITHM TO ASCERTAIN NETWORK DEVICES USED WITH ANONYMOUS IDENTIFIERS

(71) Applicant: T-Mobile USA, Inc., Bellevue, WA (US)

(72) Inventors: Rami Al-Kabra, Bothell, WA (US); Douglas Galagate, Bellevue, WA (US); Eric Yatskowitz, Seattle, WA (US); Chuong Phan, Seattle, WA (US); Tatiana Dashevskiy, Edmonds, WA (US); Prem Kumar Bodiga, Bothell, WA (US); Noah Dahlstrom, Seattle, WA (US); Ruchir Sinha, Newcastle, WA (US); Jonathan Morrow, Issaquah, WA (US); Aaron Drake, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/077,881

(22) Filed: Oct. 22, 2020

(65) Prior Publication Data

US 2021/0042442 A1 Feb. 11, 2021

Related U.S. Application Data

(63) Continuation-in-part of application No. 16/932,491, filed on Jul. 17, 2020, which is a continuation of (Continued)

(51) Int. Cl.
*G06F 21/62* (2013.01)
*H04L 9/40* (2022.01)
(Continued)

(52) U.S. Cl.
CPC ...... *G06F 21/6254* (2013.01); *H04L 63/0421* (2013.01); *H04L 67/02* (2013.01);
(Continued)

(58) Field of Classification Search
CPC ......... H04L 67/02; H04L 67/22; H04L 67/10; H04L 63/0421; H04L 63/168;
(Continued)

(56) References Cited

U.S. PATENT DOCUMENTS 7,748,028 B2 6/2010 Sato et al.
8,856,944 B2 10/2014 Clift et al.
(Continued)

OTHER PUBLICATIONS

International Application No. PCT/US2018/059078, International Search Report and Written Opinion dated Feb. 13, 2019, 12 pages.
(Continued)

*Primary Examiner* — Amare F Tabor
(74) *Attorney, Agent, or Firm* — Han Santos, PLLC (57) ABSTRACT

Techniques for identifying certain types of network activity are disclosed, including parsing of a Uniform Resource Locator (URL) to identify a plurality of key-value pairs in a query string of the URL. The plurality of key-value pairs may include one or more potential anonymous identifiers. In an example embodiment, a machine learning algorithm is trained on the URL to determine whether the one or more potential anonymous identifiers are actual anonymous identifiers (i.e., advertising identifiers) that provide advertisers a method to identify a user device without using, for example, a permanent device identifier. In this embodiment, a ranking threshold is used to verify the URL. A verified URL associate the one or more potential anonymous identifiers with the user device as actual anonymous identifiers. Such techniques may be used to identify and eliminate malicious and/or undesirable network traffic.

20 Claims, 8 Drawing Sheets

Related U.S. Application Data application No. 15/801,971, filed on Nov. 2, 2017, now Pat. No. 10,762,238.

(51) Int. Cl.

| | | |
|---|---|---|
| *H04W 12/02* | (2009.01) | |
| *H04L 67/02* | (2022.01) | |
| *H04L 69/22* | (2022.01) | |
| *H04L 67/50* | (2022.01) | |
| *G06Q 30/02* | (2012.01) | |

(52) U.S. Cl.
CPC ............ *H04L 67/535* (2022.05); *H04L 69/22* (2013.01); *H04W 12/02* (2013.01); *G06Q 30/0267* (2013.01); *G06Q 30/0277* (2013.01); *H04L 63/168* (2013.01)

(58) Field of Classification Search
CPC ............ G06F 21/6254; H04W 12/02; H04W 12/121; G06Q 30/0277; G06Q 30/0267
USPC .......................................................... 726/27
See application file for complete search history.

(56) References Cited

U.S. PATENT DOCUMENTS

| | | | |
|---|---|---|---|
| 9,608,986 B2 | 3/2017 | Ogawa | |
| 9,774,594 B2 | 9/2017 | Gatto et al. | |
| 9,838,407 B1* | 12/2017 | Oprea | ................ H04L 63/1416 |
| 9,930,065 B2* | 3/2018 | Nelms | ................ H04L 63/1425 |
| 10,057,279 B1* | 8/2018 | Balduzzi | ............... H04L 63/145 |
| 10,104,113 B1* | 10/2018 | Stein | ................... H04L 63/1425 |
| 10,706,118 B1* | 7/2020 | Yang | .................. H04N 21/4667 |
| 10,728,612 B2* | 7/2020 | Lidow | ................ H04N 21/6543 |
| 10,740,415 B2 | 8/2020 | Zhong et al. | |
| 10,878,055 B2 | 12/2020 | Ohara et al. | |
| 2008/0033740 A1 | 2/2008 | Cahn et al. | |
| 2008/0092242 A1 | 4/2008 | Rowley | |
| 2009/0192866 A1 | 7/2009 | Kamam et al. | |
| 2009/0300066 A1 | 12/2009 | Guo et al. | |
| 2011/0030043 A1 | 2/2011 | Jones et al. | |
| 2016/0234203 A1 | 8/2016 | Gatto et al. | |
| 2017/0013070 A1 | 1/2017 | Comstock et al. | |
| 2017/0270416 A1* | 9/2017 | Sri | ......................... G06Q 10/04 |
| 2017/0287012 A1 | 10/2017 | Barz et al. | |
| 2018/0285467 A1 | 10/2018 | Ohara et al. | |
| 2019/0130133 A1 | 5/2019 | Al-Kabra et al. | |

OTHER PUBLICATIONS

U.S. Appl. No. 15/801,971, Final Office Action dated Dec. 12, 2019, 17 pages.

U.S. Appl. No. 15/801,971, Non Final Office Action dated Jul. 10, 2019, 22 pages.

U.S. Appl. No. 15/801,971, Notice of Allowance dated Apr. 29, 2020, 14 pages.

U.S. Appl. No. 16/932,491, Office Action dated Jan. 21, 2022, 27 pages.

U.S. Appl. No. 16/932,491, Final Office Action dated Aug. 5, 2022, 15 pages.

* cited by examiner

USING MACHINE LEARNING ALGORITHM TO ASCERTAIN NETWORK DEVICES USED WITH ANONYMOUS IDENTIFIERS

CROSS REFERENCE TO RELATED PATENT APPLICATION

This application is a continuation-in-part of prior U.S. patent application Ser. No. 16/932,491 filed on Jul. 17, 2020, entitled "Ascertaining Network Devices Used with Anonymous Identifiers," which is a continuation of prior U.S. Pat. No. 10,762,238 issued on Sep. 1, 2020, entitled "Ascertaining Network Devices Used with Anonymous Identifiers," which is hereby incorporated by reference in its entirety.

BACKGROUND

Electronic device manufacturers have implemented various techniques to assist in documenting and tracking electronic devices, including storing accessible device identifiers in device memory. Typically, such identifiers were simply a specific serial number permanently associated with the electronic device. There are advantages to having such a device-specific identifier, but as technology developed, such identifiers proved to be a vehicle by which most advertising companies profiled cellular telephone users for marketing purposes. Over time, issues were raised about provision of device identifiers to marketing companies without a device user's permission. In response, some device manufacturers began using advertisement identifiers, which could be changed by a device user and, therefore, were not permanently linked to an electronic device.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Overview

This disclosure is directed to techniques for ascertaining network devices that are used with anonymous identifiers. The network devices may include cellular phones, smartphone, laptop, or other similar functioning devices. The anonymous identifiers may represent advertising identifiers that can be associated with the network devices. Such anonymous identifiers are designed to provide advertisers (e.g., a sports car advertiser) a method to identify the network device without using a permanent device identifier, such as a serial number or a mobile phone number (i.e., a Mobile Station International Subscriber Directory Number (MSISDN)). As such, the anonymous identifiers are also advertising identifiers that may be used by the advertisers to identify the network device.

As an overview consistent with the techniques described herein, an original dataset includes Uniform Resource Locators (URLs) that are verified using manual evaluations i.e., the manual evaluation does not use machine learning algorithms. The original dataset includes manually evaluated URLs that are used as training data to create a prediction model or machine learning algorithm. The created machine learning algorithm is then trained to a list of new URL samples to classify each one of these new URL samples. A classified URL sample includes a corresponding number of votes that are generated from the training of the machine learning algorithm. The number of votes corresponding to each one of the new URL samples is then ranked to select a verified URL. The verified URL includes one or more advertising identifiers that may be used by the advertisers to identify the network device that transmitted the new URL samples.

In an example embodiment, when the network device transmits a list of URLs (or interchangeably referred to herein as URL samples) to a network server, the network server parses each URL to extract corresponding URL components (or features) such as protocol, domain, path, query string that may include one or more potential anonymous identifiers, hash, and the like. The network server may then train the machine learning algorithm (e.g., a Random Forest algorithm) on each one of the parsed URLs to classify each one of the URLs. The classified URLs are then ranked based on their number of votes, which indicates a likelihood that they include potential anonymous identifiers that are actually anonymous identifiers.

Based upon the ranking of each one of the URLs, the network server may select the highest-ranked URL (e.g., highest generated votes) as a verified URL. Alternatively, or additionally, the network server may use a ranking threshold to select the verified URL. With the verified URL, the network server associates the components of the verified URL with the network device. Particularly, the network server associates the one or more potential anonymous identifiers of the verified URL as actual anonymous identifiers of the network device. Such techniques may be used to identify and eliminate malicious and/or undesirable network traffic in the network server. For example, when the same potential anonymous identifier is monitored from different transmitting network devices, then the potential anonymous identifier is not only treated as an "unverified" anonymous identifier but it may also indicate a spam or counterfeit communication where the same URL is copied from one network device to other network devices.

As described herein, the potential anonymous identifier includes a detected character string that matches a format of the anonymous identifier, while the actual anonymous identifier includes the potential anonymous identifier in the URL that is verified upon the application of the machine learning algorithm. For example, a new URL sample is parsed and detected to include a character string that matches the format of the anonymous identifier. At this stage, the detected character string is treated as a potential anonymous identifier. However, if after the application of the machine learning algorithm the new URL sample is found to include a ranking that is above the ranking threshold, then the previously treated potential anonymous identifier is now considered to be an actual anonymous identifier. The ranking threshold, for example, may include a minimum number of generated votes from machine learning algorithm decision trees (e.g., Random Forest decision trees) so that when the machine learning algorithm is applied to the URL sample and the number of votes exceeds the minimum, the URL sample is verified and the anonymous identifier is considered to be actual.

In an example embodiment, the machine learning algorithm may include an algorithm that utilizes the query string and other URL components as distinct features to classify the parsed URL. Since each URL component includes a different capability of classifying the URL sample from other URL samples, each URL component may be treated as a distinct feature when used to classify the URL sample. A classification of the URL may include aggregation of votes from different decision trees to decide on a final class of the parsed URL. In this case, the machine learning algorithm runs the query string component and other components of the parsed URL through the different decision trees to calculate the votes (i.e., similarity value) of the URL. Generally, a high number of votes indicates high similarity and thus, a high ranking of the URL. For example, a URL is shown below:

http://tealium.com/solutions/
?parameter1¶meter2¶meter3#section3.

In this example, the network server parses the URL to identify the "http://" as the protocol; "Tealium.com" as the domain; "solutions" as the path; "parameter1¶meter2¶meter3" as the query string; and "section3" as the hash. The "protocol" component may determine how data may be transferred between a host and a web browser (or client). The "domain" component is a user-friendly form of an IP address. The "path" component may refer to exact location of a page, post, file, or other asset. The "query string" component may include key-value pairs that are commonly used for tracking, analytics, and as encoding specific information for use within websites and applications. The key-value pair (e.g., KEY=VALUE) in the query string may be found after "?" character and separated by an ampersand "&." Further, the "key" in the key-value pair may include variables that are known to be associated with the network device, while the "value" in the key-value pair may include character strings that may match a format of an anonymous identifier. The "hash" component may point a browser to a specific spot in a page or website. Other components may be added in the URL without affecting the embodiments described herein.

In the illustrated example, the machine learning algorithm is trained on the URL, and the machine learning algorithm utilizes the identified query string ("parameter1¶meter2¶meter3") as a distinct feature to calculate the similarities i.e., generated number of votes. The calculated similarities are then used to rank the URL. In an embodiment, the ranking threshold is utilized to select the verified URL. The verified URL includes the key-value pairs having one or more actual anonymous identifiers that will be associated with the device identifier of the transmitting network device. The actual anonymous identifiers in the verified URL are then used to deliver content tailored to a specific topic in the parsed URL. In this way, a user's personal identifying information is not exposed to an entity wishing to deliver tailored content to the user. As further described in detail below, the machine learning algorithm is created from the original dataset that includes URLs that are verified using a method other than the machine learning algorithm.

Details regarding the novel techniques reference above are presented herein are described in detail, below, with respect to several figures that identify elements and operations used in systems, devices, methods, computer-readable storage media, etc. that implement the techniques.

Example Network Environment

Figure 1:
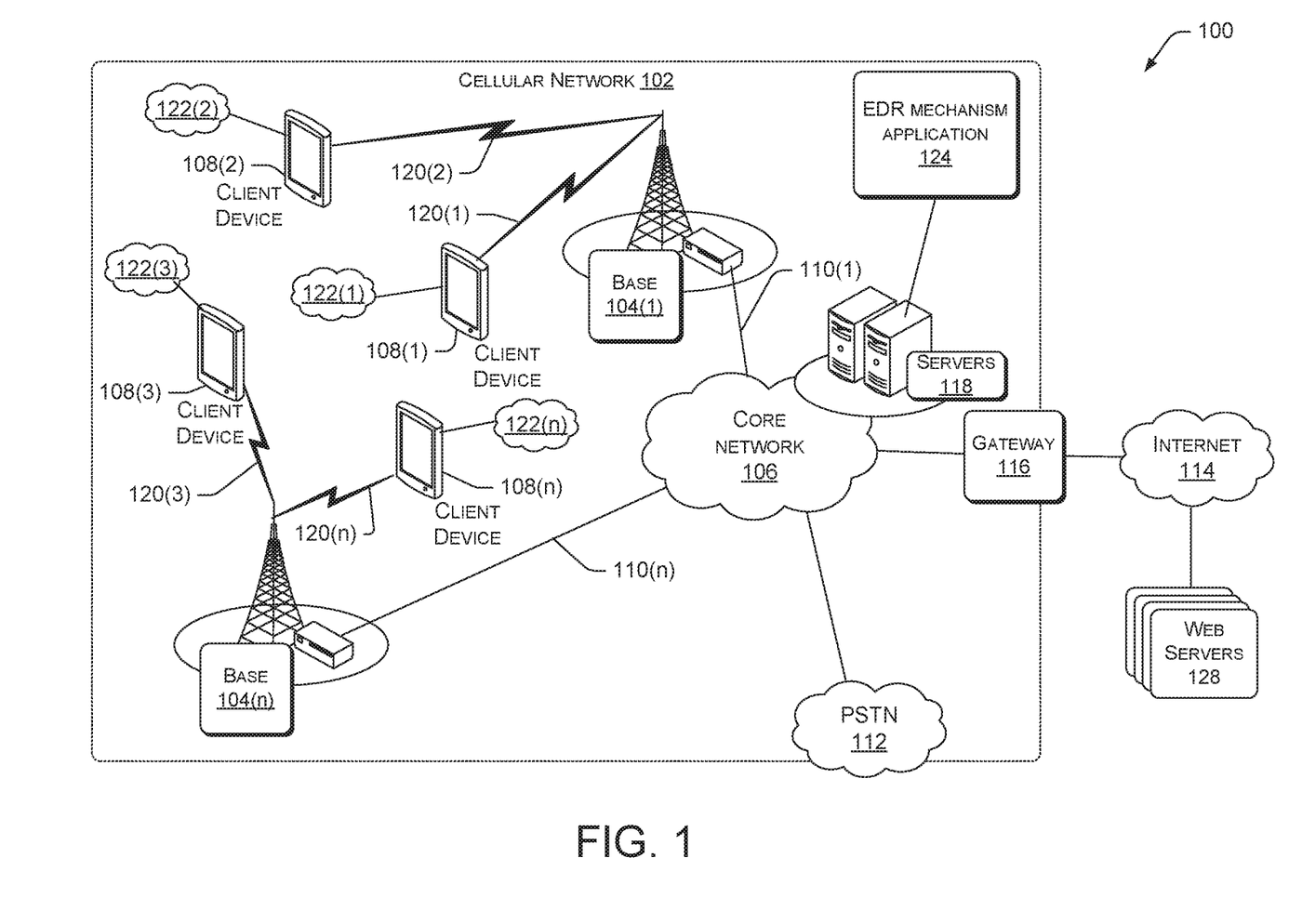
FIG. 1 is a diagram of an example cellular network environment in which the technological solutions described herein may be implemented.

FIG. 1 is a diagram of an example cellular network environment 100 in which the technological solutions described herein may be implemented. FIG. 1 illustrates a concept of ascertaining network devices used with anonymous identifiers. Particularly, the concept utilizes a machine learning algorithm to ascertain the network devices used with anonymous identifiers. It is noted that, although the present discussion refers to a cellular network, other network architectures may be used in place of the cellular network shown and described with respect to FIG. 1.

The cellular network environment 100 includes a cellular network 102 that is provided by a wireless telecommunication carrier. The cellular network 102 includes cellular network base stations 104(1)-104(n) and a core network 106. Although only two base stations are shown in this example, the cellular network 102 may include any number of base stations. The cellular network 102 provides telecommunication and data communication in accordance with one or more technical standards, such as Enhanced Data Rates for GSM Evolution (EDGE), Wideband Code Division Multiple Access (W-CDMA), HSPA, LTE, LTE-Advanced, CDMA-2000 (Code Division Multiple Access 2000), and/or so forth.

The base stations 104(1)-104(n) are responsible for handling voice and data traffic between client devices, such as client devices 108(1)-108(n), and the core network 106. Each of the base stations 104(1)-104(n) may be communicatively connected to the core network 106 via a corresponding backhaul 110(1)-110(n). Each of the backhauls 110(1)-110(n) may be implemented using copper cables, fiber optic cables, microwave radio transceivers, and/or the like.

The core network 106 also provides telecommunication and data communication services to the client devices 108(1)-108(n). In the present example, the core network 106 connects the user devices 108(1)-108(n) to other telecommunication and data communication networks, such as a public switched telephone network (PSTN) 112, and the Internet 114 (via a gateway 116). The core network 106 includes one or more servers 118 that implement network components. For example, the network components (not shown) may include a serving GPRS support node (SGSN) that routes voice calls to and from the PSTN 112, a Gateway GPRS Support Node (GGSN) that handles the routing of data communication between external packet switched networks and the core network 106 via gateway 116. The network components may further include a Packet Data Network (PDN) gateway (PGW) that routes data traffic between the GGSN and the Internet 114.

Each of the client devices 108(1)-108(n) is an electronic communication device, including but not limited to, cellular phone, a smartphone, a session initiation protocol (SIP) phone, a laptop, a personal digital assistant (PDA), a satellite radio, a global positioning system (GPS), a multimedia device, a video device, a camera, a game console, a tablet, a smart device, a wearable device, or any other similar functioning device. Each of the client devices 108(1)-108(n) may also be referred to as a station, a mobile station, a subscriber station or unit, a wireless unit, a mobile device, a wireless device, an access terminal, a handset, a user agent, a mobile client, or some other suitable terminology. Any electronic device that is capable of using the wireless communication services that are provided by the cellular network 102 may be communicatively linked to the cellular network 102. For example, a user may use a client device 108 to make voice calls, send and receive text messages, and download content from the Internet 114. A client device 108 is communicatively connected to the core network 106 via base station 104. Accordingly, communication traffic between client devices 108(1)-108(n) and the core network 106 are handled by wireless interfaces 120(1)-120(n) that connect the client devices 108(1)-108(n) to the base stations 104(1)-104(n).

Each one of the client devices 108(1)-108(n) is also capable of connecting to an external network, including the Internet, via a wireless network connection other than the cellular network wireless services. As shown, client device 108(1) includes a connection to network 122(1), client device 108(2) includes a connection to network 122(2), client device 108(3) includes a connection to network 122(3), and client device 108(n) includes a connection to network 122(n). The wireless connections are made by way of any method known in the art, such as Bluetooth®, WiFi, Wireless Mesh Network (WMN), etc. Additionally, apart from the cellular network 102, the cellular network environment 100 includes multiple web servers 128 that are accessed through the Internet 114.

In an example embodiment, the core network 106 implements an endpoint detection and response (EDR) mechanism to monitor and collect a list of URLs from the client devices 108(1)-108(n). The EDR mechanism includes an endpoint security solution that combines real-time monitoring and collection of endpoint data with analysis capabilities. At least one of the servers 118 in the core network 106 includes an EDR mechanism application 124 that is used to classify and accordingly verify the URLs from the EDR data. That is, the EDR mechanism application 124 selects the URL or URLs that include the actual anonymous identifiers. For example, the EDR mechanism application 124 trains a machine learning algorithm (not shown) on new URL samples (not shown) to classify each one of the URL samples in the EDR data. The training of the machine learning algorithm on each one of the URL samples may generate corresponding rankings based upon the number of votes that are generated from the machine learning algorithm decision trees. In this example, the machine learning algorithm may utilize a ranking threshold to select the URL sample with a certain number of generated votes that are very likely to indicate the presence of one or more actual anonymous identifiers in the query string of the URL sample. The selected URL sample is then considered herein as the verified URL that includes the actual anonymous identifiers. With the verified URL, the actual anonymous identifiers in the verified URL are associated with the device identifier of the corresponding client device.

Continuing with the example above, the machine learning algorithm or the machine learning algorithm decision trees are derived from an original dataset (or training data) of URLs that were verified using a method that includes a manual evaluation of the components (e.g., query string component) in the original dataset URL. The manual evaluation of the URL component or components in the original dataset URL is further described in detail in subsequent figures and particularly, in FIGS. 4-5.

Example Network Server Environment

Figure 2:
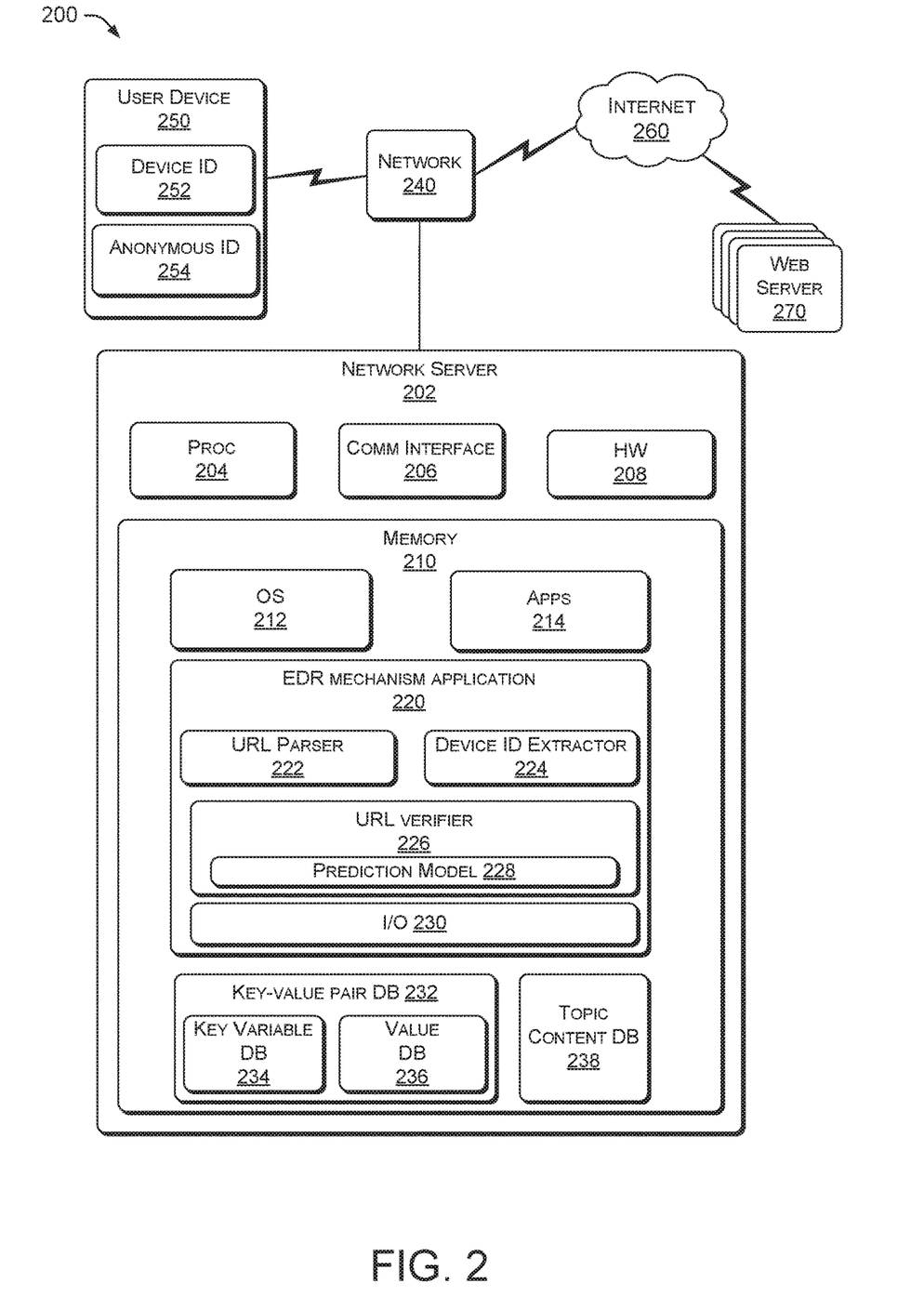
FIG. 2 is a diagram of an example network server environment in accordance with the technologies described herein.

FIG. 2 is a diagram of an example network server environment 200 in accordance with the technologies described herein. The network server environment 200 includes a network server 202. The one or more of the servers 118 shown in FIG. 1 are examples of the network server 202 in an extended operating environment, in particular, a cellular network environment 100.

The network server 202 includes a processor 204 having electronic circuitry that executes instruction code segments by performing basic arithmetic, logical, control, memory, and input/output (I/O) operations specified by the instruction code. The processor 204 can be a product that is commercially available through companies such as Intel® or AMD®, or it can be one that is customized to work with and control and particular system.

The network server 202 also includes a communications interface 206 and miscellaneous hardware 208. The communication interface 206 facilitates communication with components located outside the network server 202, and provides networking capabilities for the network server 202. For example, the network server 202, by way of the communications interface 206, may exchange data with other electronic devices (e.g., laptops, computers, other servers, etc.) via one or more networks, such as the Internet 114 (FIG. 1) and web servers 118 (FIG. 1). Communications between the network server 202 and other electronic devices may utilize any sort of communication protocol known in the art for sending and receiving data and/or voice communications.

The miscellaneous hardware 208 includes hardware components and associated software and/or or firmware used to carry out device operations. Included in the miscellaneous hardware 208 are one or more user interface hardware components not shown individually—such as a keyboard, a mouse, a display, a microphone, a camera, and/or the like—that support user interaction with the network server 202.

The network server 202 also includes memory 210 that stores data, executable instructions, modules, components, data structures, etc. The memory 210 may be implemented using computer readable media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read-Only Memory (ROM), Electrically Erasable Programmable Read-Only Memory (EEPROM), flash memory or other memory technology, Compact Disc-Read-Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of and are not formed exclusively by, modulated data signals, such as a carrier wave. In contrast, communication media may embody computer-readable instructions, data structures, program modules, or other data in a modulated data signal, such as a carrier wave, or other transmission mechanisms.

An operating system 212 is stored in the memory 210 of the network server 202. The operating system 212 controls functionality of the processor 204, the communications interface 206, the miscellaneous hardware 208, and couples the processor 204 with the memory 210. Furthermore, the operating system 212 includes components (not shown) that enable the network server 202 to receive and transmit data via various inputs (e.g., user controls, network interfaces, and/or memory devices), as well as process data using the processor 204 to generate output. The operating system 212 can include a presentation component that controls presentation of output (e.g., display the data on an electronic display, store the data in memory, transmit the data to another electronic device, etc.). Additionally, the operating system 212 can include other components that perform various additional functions generally associated with a typical operating system. The memory 210 that is in communication with the processor 204 also stores various software applications 214, or programs, that provide or support functionality for the network server 202, or provide a general or specialized device user function that may or may not be related to the example computing device per se.

The memory 210 also stores an EDR mechanism application 220 that, when executed, identifies a list of URLs from the user device, classifies each one of the URLs, verifies each one of the classified URLs, and associates the verified URL(s) with the user device. The EDR mechanism application 220 may be a single block of executable instructions or it may be made up of several components, as shown. The components included in at least one implementation are described below. However, it is noted that in other implementations, more or fewer components may be configured and that one or more operations attributed to a particular component in the following description may be implemented in one or more other components.

As shown, the EDR mechanism application 220 includes a URL Parser 222, a device identifier extractor 224, a URL verifier 226 that includes a prediction model 228 as a machine learning algorithm, and an input/output component 230. Also shown in FIG. 2 and stored in the memory 210, are a key-value pair database 232 including a key variable database 234 and a value variable database 236; and a topic content database 238. Although shown apart from the EDR mechanism application 220, the key-value pair database 232 and the topic content database 238 may be implemented as a part of the EDR mechanism application 220. Conversely, the key-value pair database 232 and the topic content database 238 may be stored in other memory (not shown), in the network server 202 or in remote locations.

The network server environment 200 also includes a network 240, of which the network server 202 is a part. The network 240 may be a cellular communications network. An exemplary user device 250 is configured to communicate with and by way of the network 240. The exemplary user device 250 is associated with a device identifier 252, which is a value that permanently identifies the user device 250. The user device 250 also stores an anonymous identifier 254, which is a value that identifies the user device 250, but which can be reset or changed by a user of the user device 250.

The network 240 provides connection and communications capabilities with public and private networks, e.g., the Internet 260, and multiple web servers 270 accessible via such networks are also included in the network server environment 200. In the environment shown in FIG. 2, the user device 250 can access the Internet 260 and the web servers 270 using services available via the network 240.

Referring back to the components of the EDR mechanism application 220, the URL parser 222 is configured to monitor a plurality of URLs over the network 240. For example, the user device 250 transmits the plurality of URLs to the web server 270 via the network 240. URL parser 222 may parse each one of these URLs to identify their corresponding components. Particularly, URL parser 222 parses and identifies the plurality of key-value pairs in the query string in an attempt to locate a character string that matches a format of a typical anonymous identifier.

One type of anonymous identifier is a mobile advertising identifier (MAID), which is a randomly-generated alphanumeric (i.e., hexadecimal) code that is associated with a mobile device. Different mobile device operating systems have different names for mobile advertising identifiers used in their systems. For example, an advertising identifier used in Android® devices is called a "Google® Advertising Identifier" (GAID), while an advertising identifier used in iOS® devices is called an "Identifier for Advertisers" (IDFA or IFA).

IDFA and GAID are hexadecimal numbers and have a specified format of five (5) groups of characters, each group delimited by a hyphen (or an en dash or an em dash, which are similar to hyphens but have slightly different lengths). The five (5) groups of characters include a first group having eight (8) characters, a second group having four (4) characters, a third group having four (4) characters, a fourth group having four (4) characters, and a fifth group having twelve (12) characters. One example of an IDFA/GAID is "6F92048A-8246-4AA4-AC5D-71604681D7EB." It is noted that, although this example refers to a specific type of one kind of anonymous identifier, other formats of advertising identifiers and/or other types of anonymous identifiers may be used with the presently described techniques.

When the URL Parser 222 recognizes a pattern in the character string that matches a known pattern of the anonymous identifier, the character string is stored in the value variable database 236 as potential anonymous identifier. When this occurs, the device identifier extractor 224 code segment identifies the device identifier 252 in the user device 250 and stores the device identifier 252 in the value variable database 236 so that the device identifier 252 is associated with the potential anonymous identifier recently identified.

However, there is a possibility that the character string that is identified and stored in the value variable database 236 as a potential anonymous identifier is not actually an actual anonymous identifier. In this regard, and to increase confidence that the stored potential anonymous identifier is an actual anonymous identifier, the URL verifier 226 code segment trains the prediction model 228 on the monitored URL to classify whether it includes the actual anonymous identifier. The URL verifier 226 code segment may run the components of the monitored URL on the prediction model decision trees and compare the generated votes to the ranking threshold to verify the monitored URL as described herein. For example, two URL samples out of ten URL samples include generated votes that are above the ranking threshold. In this example, these two URL samples are assumed to include actual anonymous identifiers in their corresponding query strings.

The prediction model 228 may include software, hardware, or a combination thereof, to classify the new URL samples based upon a plurality of key-value pairs, domain, path, and other distinct features of the URL. The prediction model 228 may include an algorithm such as, for example, a Random Forest algorithm that run the components of the parsed URL through multiple of decision trees to generate votes, which indicate their similarity to original dataset verified URLs. The generated votes are then utilized to rank the URL from other URL samples. The URL verifier 226 may then use the ranking threshold to determine the verified URL or URLs. For example, the ranking threshold includes a minimum of 80 generated votes. In this example, the URL sample or samples with generated votes of at least 80 votes will be considered as verified URL sample.

The prediction model 228 may be created from a set of training data or original dataset (not shown) composing of a plurality of URLs that were verified in a different manner or without the use of the machine learning algorithm. Such techniques for verifying that a potential anonymous identifier is an actual anonymous identifier call for leveraging characteristics of certain types of anonymous identifiers to rule out potential anonymous identifiers as being actual anonymous identifiers. The use cases described below, rely on characteristics of the class of anonymous identifiers that are advertising identifiers. Based on these characteristics, actual anonymous identifiers can be verified even without the use of the machine learning algorithm.

One characteristic of advertising identifiers leveraged in operations to verify that a potential advertising identifier is an actual advertising identifier has been described above, in an operation that identifies a character string formatted similarly to a known format for advertising identifiers. Another characteristic that can be leveraged is that a character string identified as a potential anonymous identifier will likely be related to a "key variable," which may also be referred to simply as a "key." A URL query string (found after the first "?" character in a URL), is represented by key-value pairs (e.g., KEY=VALUE) separated by an ampersand ("&"). The character string in a known format will be found in a value that is associated with a key variable. For example, a URL including "http://search.com/?IDFA=6F92048A-8246-4AA4-AC5D-71604681D7EB . . . " includes a character string in the format of an advertising identifier and that is a value associated with a key variable "IDFA." IDFA is known to be a key variable associated with advertising identifiers. Therefore, the character string is likely to be an advertising identifier.

The key variable database 234 stores multiple instances of key variables known to be associated with a type of anonymous identifier. Continuing with the previous example, "IDFA" is recognized as an advertising identifier because it is stored in the key variable database 234 as a known advertising identifier key variable. The key variable database 234 may store known key variables related to only one type of anonymous identifier (e.g., advertising identifiers), or it may store known key variables related to multiple types of anonymous identifiers, grouped according to type. In the present example, the key variable database 234 stores multiple instances of known advertising identifiers, examples of which include, but are not limited to: IDFA, UVID, UUID, UDID, IFA, GAID, google_aid, google_aid_raw, google_aid_sha1, google_aid_md5, google_aid-lower, google_aid_sha1_lower, google_aid_md5 lower, google_aid_alphanumeric, google_aid_alphanumeric_lower, AAID, google_aid_alphanumeric_lower_sha1, google_alphanumeric_lower_md5, android_id, android_id-sha1, ios_ifa, open_udid, etc.

Continuing with the example of advertising identifiers, another characteristic of advertising identifier used with mobile cellular devices is that it is highly unlikely that the same advertising identifier will be associated with more than one device identifier. Since an advertising identifier is randomly generated, there is a possibility that this will be true, but it is so unlikely that it can be relied on to filter potential advertising identifiers. Therefore, if a potential advertising identifier is found in the value variable database 236 and it is associated with a device identifier that is different from the device identifier 252 that transmitted the potential advertising identifier, then the potential advertising identifier is not verified as an actual advertising identifier.

Yet another characteristic of advertising identifier that can be leveraged to validate potential advertisement identifiers is that multiple anonymous or advertising identifiers may be associated with the same device identifier. This is because advertising identifiers can be changed by a user. Similar to the characteristic exploited above, where the same advertising identifier cannot be associated with more than one device identifier, if at least a second advertising identifier is associated with the device identifier 252, then if multiple device identifiers are associated with the second advertising identifier, the potential advertising identifier is not verified to be an actual advertising identifier.

Accordingly, the URL verifier 226 may utilize the leveraging of the anonymous identifier characteristics and the use of the key variables that are known to be associated with advertising identifiers to generate a plurality of URLs with actual anonymous identifiers. The generated plurality of URLs may be treated as an original dataset or a set of training data for purposes of generating the prediction model decision trees. That is, the URL verifier 226 utilizes the generated plurality of URLs with actual anonymous identifiers as the training data to generate the prediction model 228. The features used in the prediction model decision trees include the key-value pairs in the query string, the domain feature, path feature, or a combination thereof. In this regard, the URL verifier 226 may classify and verify new URL samples via the prediction model 228 to improve efficiency and accuracy of ascertaining user devices that are associated with anonymous identifiers.

In some examples, the URL parser 222 is further configured to infer topics of interest from information contained in URLs transmitted from the user device 250 via the network 240. This can be done in any of several ways known in the art. In some cases, a host name in a URL may imply one or more topics. For example, if the URL is directed to Nike.com®, then it can be inferred that the user of the user device 250 may be interested in sportswear and/or sporting equipment. In another method, search terms included in a URL may indicate particular interests of the user. For example, if the user sends a search request to Google.com®, and includes the terms "Bluetooth®" and "speaker," then it can be inferred that the user is in the market for a Bluetooth® speaker.

When topics of interests are identified, they are associated with the device identifier 252 of the user device 250 that transmitted the URL. This may be done by storing topics and associating them with device identifiers in the value variable database 236. In at least one implementation, specific content related to topics of interest may be stored in the topic content database 238. Such content may be information about certain topics related to products, product usage, maps, services, etc. It is noted that the topic content database 238 may be stored remotely from the network server 202. For example, it may be stored with a server of an entity that serves advertising content.

Further functionality of the network server 202 and its component features is described in greater detail, below, with respect to examples of methodological implementations of the novel techniques described and claimed herein.

Example Monitored URL Communication

Figure 3:
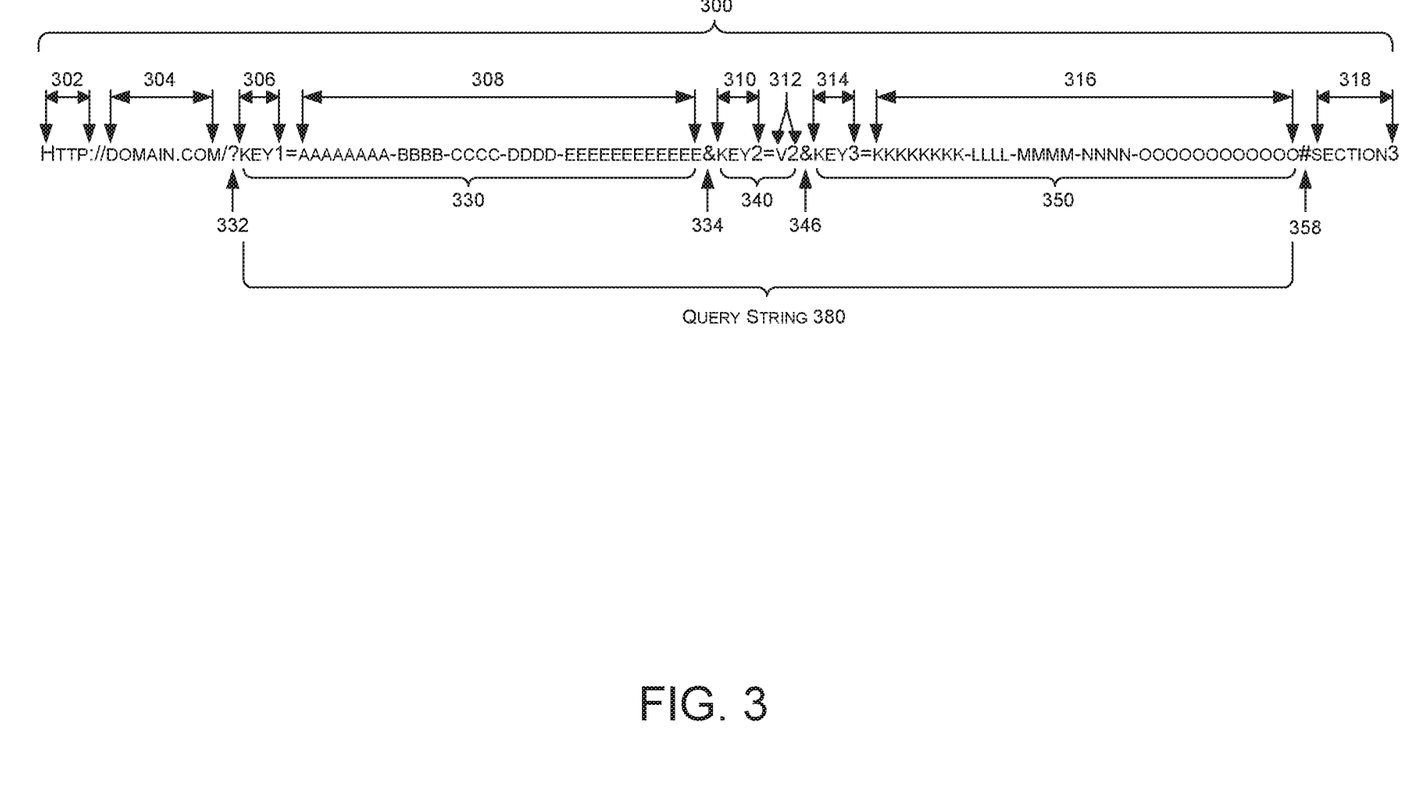
FIG. 3 is an example uniform resource locator (URL) that is transmitted by a cellular device over a cellular network in accordance with the technologies described herein.

FIG. 3 illustrates an example URL 300 that is monitored from a transmitting user device. The URL 300 includes components such as, but not limited to, a protocol 302, domain name 304, a first key 306, a first value 308, a second key 310, a second value 312, a third key 314, a third value 316, and a hash value 318. A first key-value pair 330 includes character strings between "?" character 332 and a first ampersand "&" 334; a second key-value pair 340 includes character strings between the first ampersand "&" 334 and a second ampersand "&" 346, and; a third key-value pair 350 includes character strings between the second ampersand "&" 346 and a "#" character 358. The first, second, and third key-value pairs may define a query string 380 of the URL 300. Although the query string 380 is illustrated to include three key-value pairs only, a combination of four, five, etc. key-value pairs may define the query string 380 without affecting the embodiment described herein. In an example embodiment, the URL parser (e.g., URL parser 222 in FIG. 2) parses the URL 300 to generate the different components as illustrated. The URL verifier module may then train the prediction model algorithm using some or all of the different components to verify the URL 300. A verified URL 300 is associated with the device identifier (e.g., device identifier 252 in FIG. 2) that transmitted the URL.

In the illustrated URL 300, the first value 308 and the third value 316 of the first key-value pair 330 and the third key-value pair, respectively, include character strings that are similar to the format of known anonymous identifiers. In this case, the first value 308 and/or the third value 316 may be treated as a potential anonymous identifier that is associated with the device identifier. For the second value 312 that does not match the format of the anonymous identifier, the character strings of the second value 312 may still be considered as a feature by the prediction model 228 by running the second value 312 through prediction model decision trees. Additionally, or alternatively, the key variables that are represented by the first key 306, second key 310, and the third key 314 may be treated as additional features by the prediction model 228. By running each one of the key-pair values of the query string 380 in the different prediction model decision trees, the prediction model 228 may be able to classify the parsed URL 300 with an improved confidence level and speed.

In an example embodiment, and where the illustrated URL 300 is used as one of the original dataset's verified URL, the prediction model decision trees are derived by using the URL components that may be able to facilitate the separating of the URL samples or classifications. That is, the decision trees are derived from URL component(s) that include distinctive characteristics to differentiate the URL 300 from other URL samples (not shown). For example, a combination of the first key-value pair 330, the second key-value pair 340, and the third key-value pair 350 may be used and assumed to include distinctive features that may separate the URL 300 from other URL samples. In this example, the prediction model decision trees are generated from these features of the URL 300.

Example Implementation of Generating URL Communications for Training Data

Figure 4:
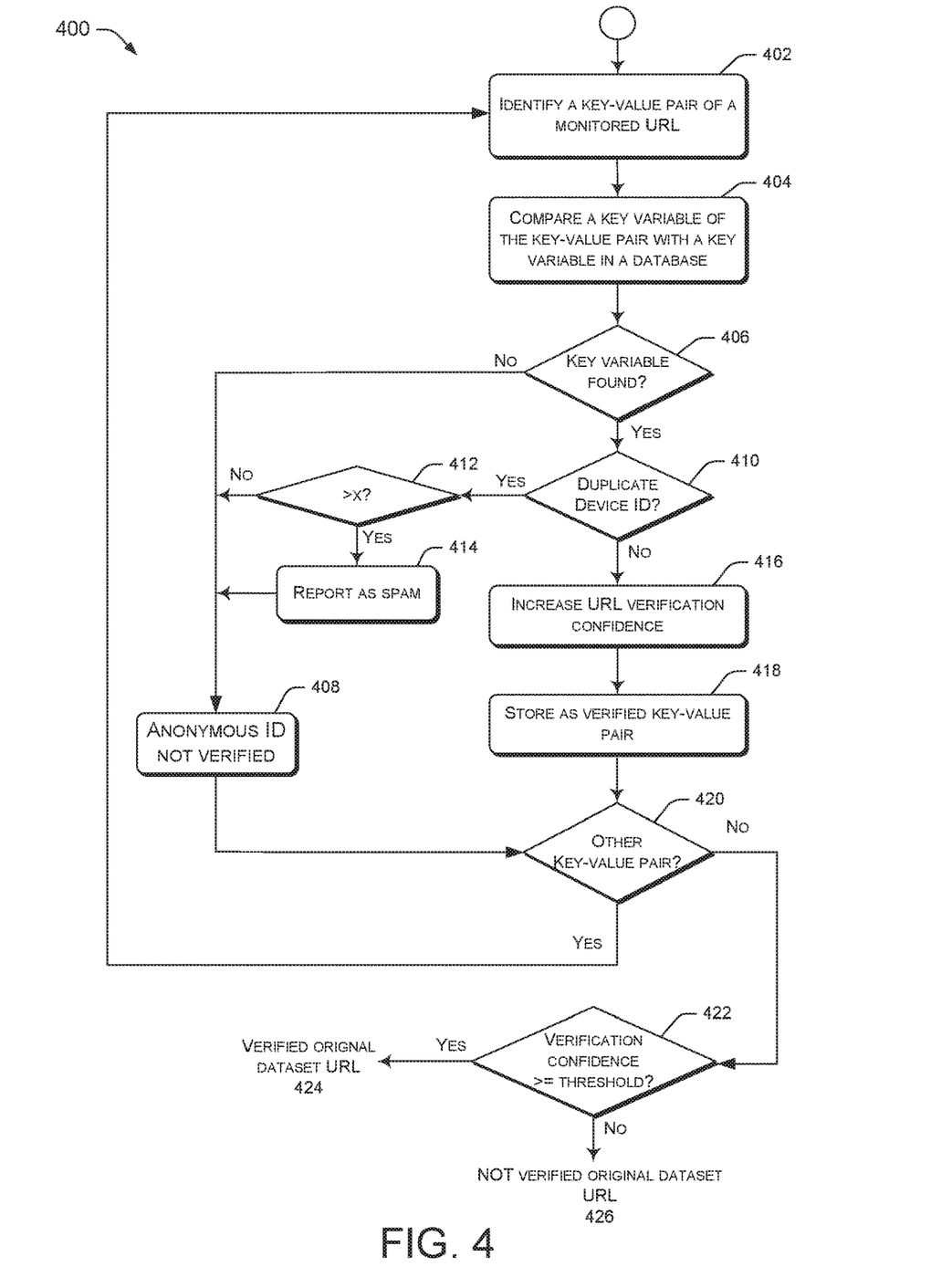
FIG. 4 is a flow diagram of an example methodological implementation for generating a URL that is used as training data to create a machine learning algorithm in accordance with the technologies described herein.

FIG. 4 is a flow diagram 400 that depicts a methodological implementation of a technique for verifying the URL that will be used as training data or as a verified URL in an original dataset, as described herein. The verifying of the URL includes manual evaluation of the key-value pairs in the URL sample i.e., without using the machine learning algorithm. In the following discussion of FIG. 4, continuing reference is made to the elements and reference numerals shown in and described with respect to the network server 202 of FIG. 2 and the components of the URL 300 in FIG. 3. Further, certain operations may be ascribed to particular system elements shown in previous figures. However, alternative implementations may execute certain operations in conjunction with or wholly within a different element or component of the system(s). To the extent that certain operations are described in a particular order, it is noted that some operations may be implemented in a different order to produce similar results.

At block 402, the URL verifier 226 (FIG. 2) code segment receives a key-value pair from the URL Parser 222. The key-value pair may include a value-character string that is in the format of a known anonymous identifier, plus a key variable. In a typical URL query string, a key variable associated with a key value is in the format "KEY={value}, where "KEY" is the key variable and "{value}" is a value assigned to the key variable. When a character string that is identified as having a format similar to a known anonymous identifier follows an "equals" sign ("="), then a term positioned before the equals sign is extracted as a key variable. For example, and for the first key-value pair 330, the first key 306 and the first value 308 are extracted as the "key" variable and the "value," respectively. In this example, the first key 306 is positioned before the equals sign ("=") in the first key-value pair 330. At block 402, the URL verifier 226 identifies the extracted first key-value pair of the monitored URL from the URL parser 222.

At block 404, the key variable of the key-value pair is compared to key variables stored in the key variable database 234. The key variable database 234 stores one or more terms that are known to denote anonymous identifiers, such as "IDFA," "UVID," "UUID," "IFA," etc. If the key variable extracted from the key-value pair is not found in the key variable database 234 ("No" branch, block 406), then the character string of the "value" in the key-value pair is not verified as an anonymous identifier (block 408).

If the key variable extracted from the key-value pair is found in the key variable database 234 ("Yes" branch, block 406), then a confidence that the extracted character string is an anonymous identifier is increased. In one or more alternate implementations, the character string may be verified as an anonymous identifier at this point. However, greater confidence can be achieved by taking additional steps described below.

At block 410, the character string from the key-value pair that is the potential anonymous identifier is compared to the anonymous identifiers stored in the value variable database 236 to determine if an identical character string (i.e., anonymous identifier) is stored in the value variable database 236. If so, then the device identifier 252 associated with the user device 250 that transmitted the URL query string currently being parsed is compared with a device identifier associated with the stored identical character string (i.e., stored identical anonymous identifier). If a duplicate device identifier is found ("Yes" branch, block 410), then the character string is not verified as an anonymous identifier. This is because of the high likelihood that an anonymous identifier will only be associated with a single device identifier. Thus, when the anonymous identifier is found to be associated with multiple device identifiers in block 410, then the character string of the "value" in the key-value pair is not verified.

In at least one implementation, the number of occurrences of duplicate device identifiers is determined (blocks 412 and 414). If a low number of duplicate device identifiers are found, then it could be the result of the anonymous identifier not being one that is uniquely associated with a single device identifier. However, if a large number of duplicate device identifiers are found, it could mean that the URL is potentially malicious traffic, such as spam.

One way that spammers operate is to copy a URL from network traffic, then insert the URL into network traffic of other network devices. When the URL is copied, any anonymous identifier that is included in the URL is copied as well, and when it is inserted into traffic from a different device, the same anonymous identifier appears to be related to the different devices. For instance, if the anonymous identifier is an advertising identifier, spammers may steal and reuse the URL to put information in a location where an advertisement might normally go.

At block 412, a determination is made as to whether the number of duplicates is significant regarding spam detection. This number is an implementation feature that can vary, but an example of such a number is ten (10). In other words, if ten (10) or more duplicate device identifiers are found to be associated with the character string that is a potential anonymous identifier ("Yes" branch, block 412), then the URL is reported as spam at block 414. It is noted that there need not be more than a single duplicate to suspect possible spamming. In other words, the implementation may include a duplicate test value of two rather than ten. In any suspected case, further investigation can be made to determine if, in fact, a spamming operation is occurring.

If the number of duplicates is less than the specified number, e.g., ten (10) ("No" branch, block 412), then the character string is not verified as an anonymous identifier (block 408).

If a duplicate device identifier is not found ("No" branch, block 410), then the key-value pair is considered as a verified key-value pair that includes actual anonymous identifiers. It is noted that each key-value pair is processed distinctly and separately from the other key-value pairs for purposes of establishing training data that will be used to generate the prediction model as described herein.

At block 416, a confidence level for the URL is increased based upon the verified key-value pair. The URL may include multiple key-value pairs in its query string. As such, the higher the number of verified key-value pairs in its query string, the more likely that it will be included as training data or as a URL in the original dataset that is used to generate the prediction model decision trees. In an example embodiment, the confidence level at block 416 may include an incremented step for each key-value pair. Depending upon the number of key-value pairs in the query string of the URL to be processed, the confidence level may keep on increasing until the last key-value pair is processed.

At block 418, the verified key-value pair is stored in the key-value pair database 232. Particularly, the verified key variable and the value of the key-value pair are stored in the key variable database 234 and value variable database 236, respectively.

At block 420, the URL verifier 226 determines whether the processed key-value pair includes the last key-value pair in the query string of the URL. If another key-value pair is present ("Yes" branch, block 420), then the process goes back to block 402 where the other key-value pair is identified and processed at blocks 404-418. If the processed key-value pair includes the last key-value pair in the query string of the URL ("No" branch, block 420), then at block 422, the verification confidence or the confidence level is compared to a preconfigured confidence threshold. The confidence threshold, for example, may include a preconfigured value that indicates whether URL is verified ("Yes" branch, block 422) or not verified ("No" branch, block 422). In this example, the confidence threshold may be set to equal the number of key-value pairs in the URL.

In some examples, the value-character strings in the key-value pair may not include character strings that match the format of the anonymous identifier. For example, and with reference to the URL 300 in FIG. 3, the second value 312 includes the character strings "v2" that do not conform or match the format of the anonymous identifier. In this example, the character string "v2" is still compared with character strings in the value variable database 236 to determine if an identical character string is stored in the value variable database 236. If so, then the device identifier 252 that is associated with the user device 250 is compared with a device identifier associated with a stored identical character string. If a duplicate device identifier is found ("Yes" branch, block 410), then the character string is not verified as an anonymous identifier. This is because of the high likelihood that the character strings of the value in the key-value pair will only be associated with a single device identifier even though the character strings do not match the format of a typical anonymous identifier. Although the character string "v2" is not used as an actual anonymous identifier as described herein, the verification of this type of character string may increase the confidence for the verification of the URL as a whole.

Upon verification of the URL (verified original dataset URL 424), or indication of an unverified URL (not verified original dataset URL 426), the URL is stored in the memory 210 and particularly, in the key-value pair database 232. A plurality of these stored verified/unverified URLs may be used as training data or original dataset URLs to generate the prediction model 228. The prediction model 228, in this case, may utilize all components of the URL as base features in its decision trees rather than using only the features of the query string.

Example Training Data/Original Dataset to Generate a Prediction Model

Figure 5:
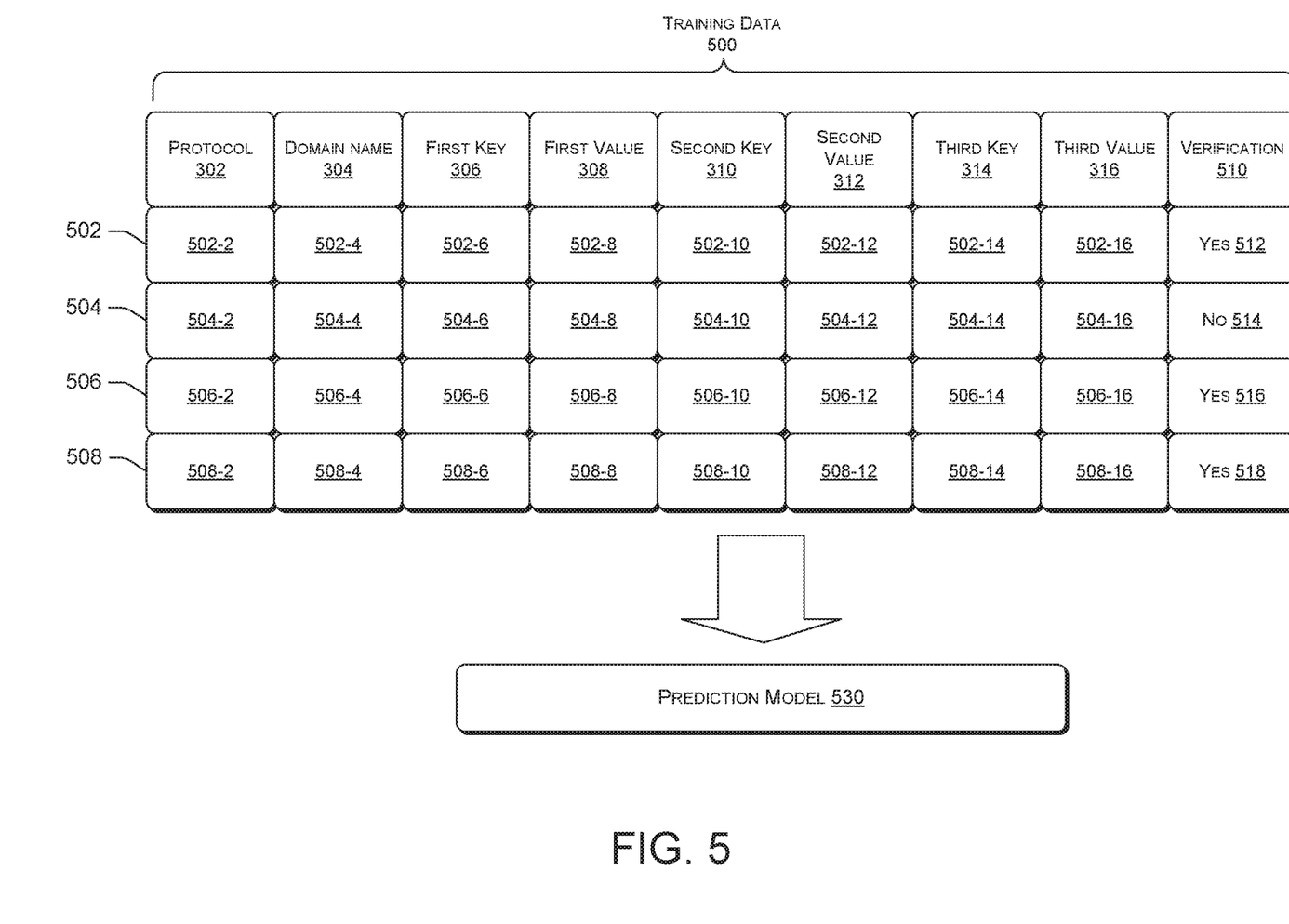
FIG. 5 is a table of an example training data or an original dataset and a machine learning algorithm that is created from the training data/original dataset in accordance with the technologies described herein.

FIG. 5 illustrates training data 500 that is used to generate a prediction model 530. In the following discussion of FIG. 5, continuing reference is made to the elements and reference numerals shown in and described with respect to the network server environment 200 of FIG. 2 and the URL 300 in FIG. 3. The training data 500 includes an original dataset of verified URLs 502-508. Each one of the verified URLs 502-508 includes components such as the components of URL 300 as described in FIG. 3. For example, each verified URL component includes a protocol 302, domain name 304, first key 306, first value 308, and so on. Further, each one of the URLs 502-508 is verified using the process as described in FIG. 4. For example, the URL 502 is verified by first processing a first key 502-6 and a first value 502-8 at a first iteration of the methodological implementation described in FIG. 4, then processing a second key 502-10 and a second value 502-12 next, and so on. In this example, the confidence level is measured after the key-value pairs are evaluated to generate a verification 510.

Each one of the URLs 502-508 further includes the verification 510 that indicates the classification of the original dataset URL. The verification 510, for example, is derived from an output of block 422 in FIG. 4 where the confidence level is compared with the confidence threshold. As illustrated, the classifications for the verified URLs 502-508 include a "Yes 512," "No 514," "Yes 516," and "Yes 518," respectively. The "Yes" classification indicates that the query string of the original dataset URL is very likely to include one or more actual anonymous identifiers. The "No" classification indicates that the query string of the URL is unlikely to include one or more actual anonymous identifiers. With the verified URLs 502-508, the EDR mechanism application 220 or the URL verifier 226 utilizes these URLs as training data or original dataset to generate the decision trees of the prediction model 530. The prediction model 530 is the same as prediction model 228 in FIG. 3. The number of URLs used as training data/original dataset is for illustration purposes only and multiple other verified URLs may be utilized to generate the prediction model 530.

Example Verification of New URL Samples Via the Prediction Model

Figure 6:
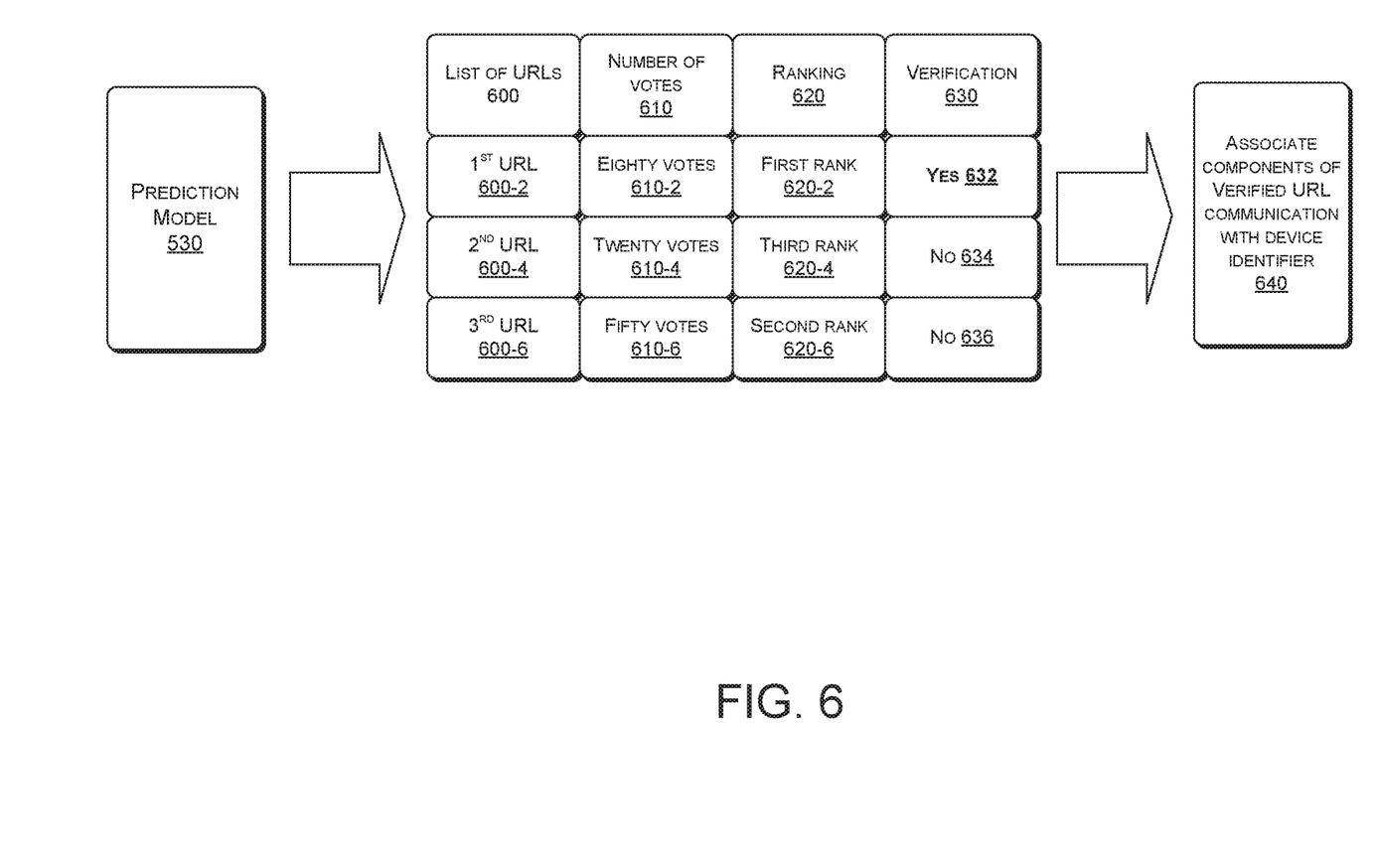
FIG. 6 is a flow diagram of a created prediction model that is trained to a list of new URL samples to verify each one of the URLs in accordance with the technologies described herein.

FIG. 6 illustrates a created prediction model 530 that is trained to a set of new samples that includes a list of URLs 600. The training of the prediction model 530 generates a number of votes 610, ranking 620 and upon further comparison to a ranking threshold, a verification 630 is outputted. A verified URL 600 is then associated with a device identifier of the user device at output block 640.

With the generated prediction model 530 in FIG. 5, the prediction model 530 is trained on the list of monitored URLs 600 to classify whether these new sets of URL samples include components that may be associated with the device identifier. The prediction model 530 may include a Random Forest algorithm that utilizes a plurality of decision trees when classifying the URL 600. For example, the Random Forest algorithm runs the components of the parsed URL through the decision trees to generate the number of votes 610. In this example, the generated votes 610 are then used as a reference for the ranking 620 of the verified URL. This rank is compared to a ranking threshold (not shown) to verify the URL as shown in verification 630. The ranking threshold may include a preconfigured value of generated votes that are very likely to indicate the inclusion of actual anonymous identifier(s) in the new URL sample.

For example, the prediction model is trained on each one of the URLs (600-2) to (600-6). In this example, the components of each one of the URLs (600-2) to (600-6) are processed through the decision trees to calculate their corresponding generated votes 610-2, 610-4, and 610-6, respectively. The generated votes for the URLs (600-2) to (600-6) are then ranked to include a first rank 620-2, third rank 620-4, and a second rank 620-6, respectively. In this case, the first rank 620-2 indicates the verified URL ("Yes 632") that will be associated with the device identifier at block 640.

Methodological Implementation for Verifying a New URL Sample

Figure 7:
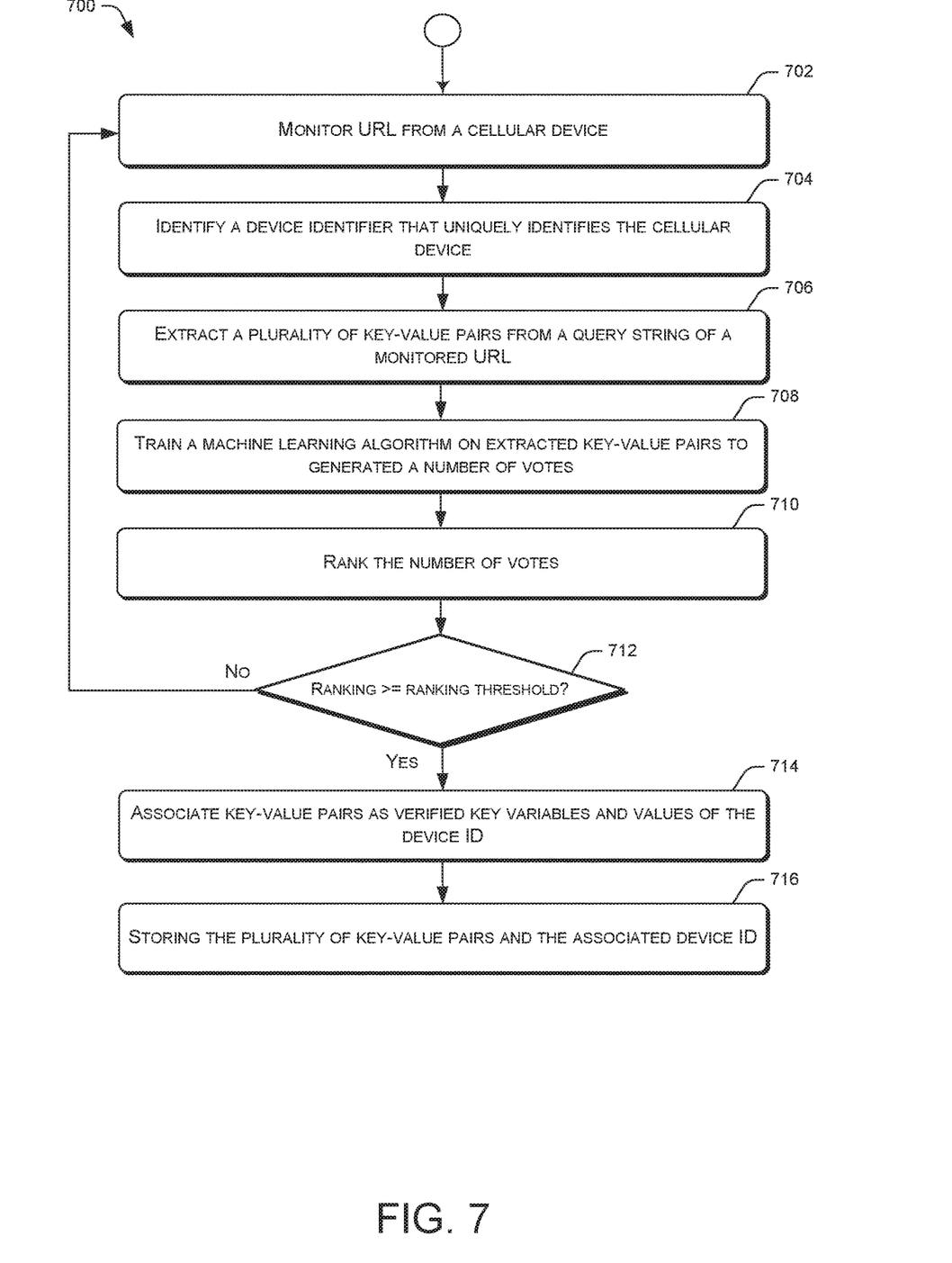
FIG. 7 is a flow diagram of an example methodological implementation for verifying the URL using the machine language algorithm.

FIG. 7 is a flow diagram of an example methodological implementation of a technique for verifying a new URL sample using the machine language algorithm. In the following discussion of FIG. 7, continuing reference is made to the elements and reference numerals shown in and described with respect to the network server environment 200 and network server 202 of FIG. 2.

At block 702, the URL Parser 222 code segment in the EDR mechanism application 220 monitors network 240 traffic between the user device 250 and one or more web servers 270. The input/output component 230 and the communications interface 206 may be utilized for inputting the traffic data stream. Depending on the implementation, all traffic over the network 240 to and from the user device 250 may be monitored, or monitoring may occur only when a new URL sample is detected in some other fashion. For instance, when a network device transmits an IP location in a navigation operation (e.g. 63.147.242.179), network components direct the traffic to a web server associated with the IP location. The monitoring may occur when an operation such as this is detected. Other techniques may also be used.

At block 704, the device identifier extractor 224 code segment locates the device identifier 252 associated with the user device 250.

At block 706, the URL parser 222 extracts a plurality of key-value pairs from a query string of the monitored URL. For example, the monitored URL (URL 300) includes the first key-value pair 330, second key-value pair 340, and the third key-value pair 350 in its query string 380. The URL parser 222 extracts these key-value pairs to be used as features for classifying the URL 300.

At block 708, the URL verifier 226 trains the prediction model 228 to the extracted plurality of key-value pairs to generate a number of votes. The prediction model 228 may include a Random Forest algorithm that uses the key-value pairs of the query string as features in the classification of the URL. Additionally, or alternatively, the prediction model 228 may also use domain name and the hash components of the URL as additional features when calculating the number of votes. Thereafter, the URL verifier 226 ranks the generated number of votes of the URL (block 710).

At decision block 712, the URL verifier 226 compares the ranking of the generated number of votes with a ranking threshold. For example, the ranking threshold includes a preconfigured minimum value that indicates the extracted key-value pairs to include the actual anonymous identifiers. If the ranking of the monitored URL is less than the ranking threshold ("No" at block 712), then the process goes back to block 702. However, if the ranking of the monitored URL is equal to or greater than the ranking threshold ("Yes" at block 712), then the_URL verifier 226 associates the extracted query string with the device identification (block 714).

At block 716, storing the plurality of key-value pairs and the associated device identifier in the database. For example, the key-value pairs of the verified URL sample are stored in the key-value pair database 232.

Methodological Implementation for Identifying Topics of Interest

Figure 8:
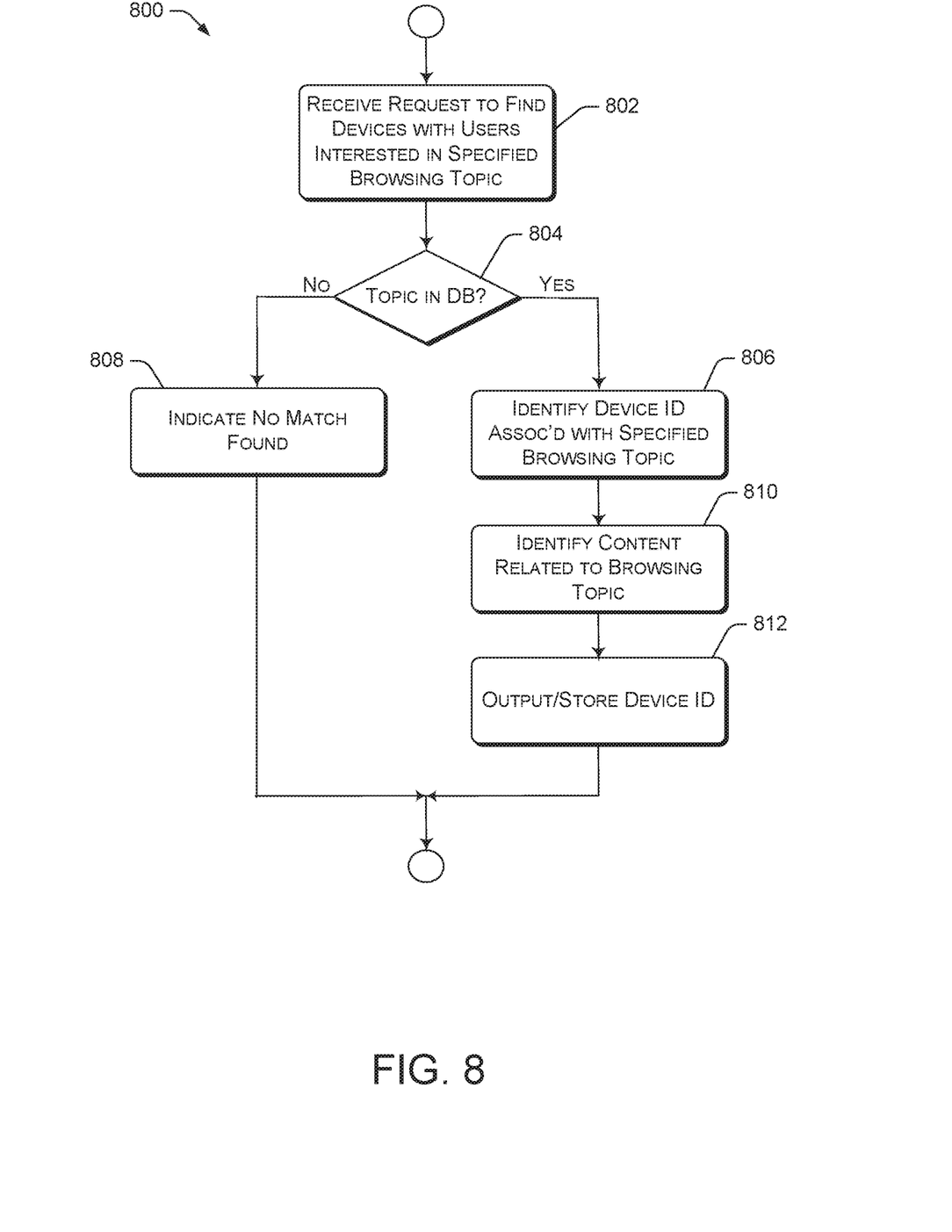
FIG. 8 is a flow diagram of an example methodological implementation for ascertaining network devices related to identified browsing topics.

Regarding FIG. 8, at block 802 the network server 202 receives a request to find devices associated with users who are interested in a specified browsing topic. For example, a request may be received to find devices associated with users who are interested in "skis." The browsing topic "skis" may have been identified from a search term in a URL query string, or it may have been derived from a server host name identified in a URL, such as "skisareus.com."

At block 804, browsing topics stored in the value database 236 are searched for the term "skis." If the browsing topic (e.g., "skis") is found ("Yes" branch, block 804), then a device identifier associated with the browsing topic is identified at block 806. If the browsing topic is not found in the value database 236 ("No" branch, block 804), then an indication that no match was found is provided in response to the request at block 808.

At block 810, content related to the browsing topic is identified in the topic content database 238. Such content has previously been identified as related to certain topics and stored in the topic content database 238. In an advertising scenario, the content is some sort of advertisement. It is noted that this step may be performed by the network server 202 or by a different entity.

At block 812, the device identifier(s) found to relate to the browsing topic are output to storage, to a local entity, or to a remote entity. As a result, the requester is able to determine devices associated with users interested in the specified browsing topic. If the EDR mechanism application 220 has also performed block 812 to identify topic content related to the browsing topic, then that content is transmitted with the device identifier(s). In at least one implementation, topic content is transmitted directly to each user device associated with the device identifier(s). In the case of a cellular network with cellular user devices, the device identifier can be the user device phone number (the MSISDN of the device), and the topic content can be sent to the phone number, such as in a text message.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer-readable storage media storing computer-executable instructions that upon execution cause one or more processors to perform acts comprising:
   monitoring a plurality of uniform resource locators (URLs) by a cellular device over a cellular network;
   extracting a query string of a monitored URL;
   extracting a plurality of key-value pairs of the query string;
   training an algorithm upon an extracted plurality of key-value pairs to generate a number of votes;
   ranking the URL based upon the number of votes;
   utilizing a ranking threshold to verify the URL, wherein the plurality of key-value pairs of a verified URL is associated with a device identifier of the cellular device; and
   storing the plurality of key-value pairs of the verified URL and the associated device identifier.

2. The one or more computer-readable storage media of claim 1, wherein the plurality of key-value pairs includes at least one key variable that is paired with a value-character string that matches a format of an anonymous identifier.

3. The one or more computer-readable storage media of claim 2, wherein the value-character string of the verified URL is an actual anonymous identifier.

4. The one or more computer-readable storage media of claim 1, wherein the plurality of key-value pairs includes at least one key variable that is paired with a value-character string having a format that is different from a format of an anonymous identifier.

5. The one or more computer-readable storage media of claim 4, wherein the algorithm utilizes the value-character string as a feature for a verification of the URL.

6. The one or more computer-readable storage media of claim 1, wherein the algorithm includes a Random Forest algorithm that utilizes the plurality of key-value pairs as a feature for a verification of the URL.

7. The one or more computer-readable storage media of claim 1 further comprising: creating the algorithm from dataset URLs that are verified using manual evaluation of each key-value pair.

8. The one or more computer-readable storage media of claim 7, wherein the dataset URLs are used as training data for the algorithm.

9. The one or more computer-readable storage media of claim 7, wherein the manual evaluation utilizes stored key variables and device identifiers in a database.

10. A device, comprising:
    a processor;
    an endpoint detection and response (EDR) mechanism coupled to the processor, the EDR mechanism further comprises:
      a uniform resource locator (URL) parser configured to monitor a plurality of URLs by a cellular device over a cellular network, and extract a plurality of key-value pairs in a query string of a monitored URL;
      a URL verifier configured to: train an algorithm upon an extracted plurality of key-value pairs to generate a number of votes; rank the number of votes; and use a ranking threshold to verify the URL, wherein the plurality of key-value pairs of a verified URL is associated with a device identifier of the cellular device; and
      a key-value pair database that stores the plurality of key-value pairs of the verified URL and the associated device identifier.

11. The device of claim 10, wherein the plurality of key-value pairs includes at least one key variable that is paired with a value-character string that matches a format of an anonymous identifier.

12. The device of claim 11, wherein the value-character string of a verified URL is an actual anonymous identifier.

13. The device of claim 10, wherein the plurality of key-value pairs includes at least one key variable that is paired with a value-character string having a format that is different from a format of an anonymous identifier.

14. The device of claim 13, wherein the algorithm utilizes the value-character string as a feature for a verification of the URL.

15. The device of claim 10, wherein the algorithm includes a Random Forest algorithm that utilizes the plurality of key-value pairs as a feature for a verification of the URL.

16. The device of claim 10, wherein the URL parser further extracts a domain name of the monitored URL, wherein the domain name is used as a feature by the algorithm.

17. The device of claim 10, wherein the algorithm is created from dataset URLs that are verified using manual evaluation of key-value pairs.

18. A computer-implemented method, comprising:
    monitoring a plurality of uniform resource locators (URLs) by a cellular device over a cellular network;
    extracting a plurality of key-value pairs in a query string of a monitored URL, wherein the key-value pairs include one or more potential anonymous identifiers;
    training a Random Forest algorithm upon an extracted plurality of key-value pairs to verify the URL, wherein a verified URL associates the one or more potential anonymous identifiers as one or more actual anonymous identifiers to a device identifier; and
    storing the one or more actual anonymous identifiers and the device identifier.

19. The computer-implemented method of claim 18 further comprising:
creating the Random Forest algorithm from dataset URLs that are verified using manual evaluation of key-value pairs.

20. The computer-implemented method of claim 19, wherein the manual evaluation utilizes stored key variables and device identifiers in a database.

* * * * *